(12) United States Patent
Ashby

(10) Patent No.: US 12,179,766 B2
(45) Date of Patent: Dec. 31, 2024

(54) SENSOR SYSTEM FOR A VEHICLE

(71) Applicant: Transportation IP Holdings, LLC, Norwalk, CT (US)

(72) Inventor: Harland Ashby, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 355 days.

(21) Appl. No.: 17/511,164

(22) Filed: Oct. 26, 2021

(65) Prior Publication Data

US 2023/0127799 A1    Apr. 27, 2023

(51) Int. Cl.
*B60W 40/02* (2006.01)
*H04W 4/46* (2018.01)

(52) U.S. Cl.
CPC .............. *B60W 40/02* (2013.01); *H04W 4/46* (2018.02); *B60W 2555/20* (2020.02)

(58) Field of Classification Search
None
See application file for complete search history.

(56) References Cited

U.S. PATENT DOCUMENTS

| 5,678,521 | A  | * | 10/1997 | Thompson | F02M 41/04 |
| | | | | | 123/446 |
| 6,945,047 | B2 | * | 9/2005 | Shea | F02D 29/06 |
| | | | | | 60/602 |
| 8,538,611 | B2 | * | 9/2013 | Kumar | B61L 27/16 |
| | | | | | 700/291 |
| 8,589,003 | B2 | | 11/2013 | Brand et al. | |
| 9,983,593 | B2 | | 5/2018 | Cooper et al. | |
| 11,315,427 | B2 | * | 4/2022 | Salles | B60W 10/18 |
| 2013/0073139 | A1 | * | 3/2013 | Henry | B61C 17/12 |
| | | | | | 701/29.3 |

* cited by examiner

*Primary Examiner* — Jean Paul Cass
*Assistant Examiner* — David Hatch
(74) *Attorney, Agent, or Firm* — K&L Gates LLP

(57) ABSTRACT

A sensor system for a vehicle includes first and second sensors onboard different vehicles. The sensors sense one or more environmental parameters. A controller receives a first signal output by the first sensor that indicates a value of the one or more environmental parameters sensed by the first sensor. The controller may control operation of a power component of the first vehicle using the value of the one or more environmental parameters received from the first sensor. The controller may detect undesirable operation of the first sensor and transition to receiving a second signal output by the second sensor that indicates the value of the one or more environmental parameters. The controller may control the operation of the power component of the first vehicle using the value of the one or more environmental parameters received from the second sensor.

20 Claims, 5 Drawing Sheets

SENSOR SYSTEM FOR A VEHICLE

BACKGROUND

Technical Field

Embodiments of the subject matter disclosed herein relate to control systems and methods for powered devices.

Discussion of Art

Many powered machines, such as vehicles and industrial machines, include sensors that measure the performance of power components of the machine. The power component may include an internal combustion engine or electrical engine powered by battery or other electrical power source. The performance of such powered components can be affected by external environmental factors such as barometric pressure, humidity, ambient temperature, and air quality. For example, engine output or efficiency can be modeled as a function of ambient temperature. Consequently, a control module operably connected to such a power component can be adapted to control performance characteristics of the power component, such as efficiency, energy output, noise, etc. based on these environmental factors.

Vehicles may have onboard sensors that measure environmental conditions, such as the barometric pressure, ambient temperature, etc. Currently, controllers onboard these vehicles are designed to derate (reduce the output capacity of) engines based on these environmental conditions. For example, the pressure drops and/or temperature increases, the rating or maximum output of the engine may be automatically reduced to avoid damage to the engine or other components of the vehicle. If a sensor goes bad or otherwise provides inaccurate output, however, the controllers currently default to derating the engines or otherwise reducing performance which can lead to road failures, even if the environmental conditions do not otherwise warrant derating or reducing performance. It may be desirable for a system that functions differently than those that are currently available.

BRIEF DESCRIPTION

In one example, a system (e.g., a sensor system for a vehicle) includes a first sensor onboard a first vehicle that may sense one or more environmental parameters, a second sensor onboard a second vehicle that may sense the one or more environmental parameters, and a controller onboard the first vehicle that may receive a first signal output by the first sensor that indicates a value of the one or more environmental parameters sensed by the first sensor. The controller may control operation of a power component of the first vehicle using the value of the one or more environmental parameters received from the first sensor. The controller may detect undesirable operation of the first sensor and transition to receiving a second signal output by the second sensor that indicates the value of the one or more environmental parameters. The controller may control the operation of the power component of the first vehicle using the value of the one or more environmental parameters received from the second sensor.

In another example, a method (e.g., for controlling operation of a vehicle) may include sensing one or more environmental parameters using a first sensor disposed onboard a first vehicle, sensing the one or more environmental parameters using a second sensor disposed onboard a second vehicle, and communicating a first signal from the first sensor to a controller disposed onboard the first vehicle. The first signal may indicate a value of the one or more environmental parameters sensed by the first sensor. The method may include controlling operation of a power component of the first vehicle using a controller onboard the first vehicle based on the value of the one or more environmental parameters received from the first sensor, detecting undesired operation of the first sensor, and transitioning to communicating a second signal output by the second sensor to the controller. The second signal may indicate the value of the one or more environmental parameters. The method also may include controlling the operation of the power component of the first vehicle using the value of the one or more environmental parameters received from the second sensor.

In another example, a system (e.g., a vehicle sensor system) includes a first sensor disposed onboard a first vehicle of a multi-vehicle system and a second sensor disposed onboard a second vehicle of the multi-vehicle system. Both the first sensor and the second sensor may measure values of an environmental condition outside of the multi-vehicle system. The system may include a controller disposed onboard the first vehicle that may automatically derate the engine of the first vehicle responsive to no longer receiving the values of the environmental condition. The controller may switch to receiving the values of the environmental condition from the first sensor to receiving the values of the environmental condition from the second sensor to avoid derating the engine of the first vehicle. The first vehicle and the second vehicle may not be mechanically coupled with each other.

BRIEF DESCRIPTION OF THE DRAWINGS

The subject matter will be understood from reading the following description of non-limiting embodiments, with reference to the attached drawings, wherein below.

DETAILED DESCRIPTION

Embodiments of the subject matter disclosed herein generally relate to control systems and methods for powered devices. These powered devices may have failover capabilities with regard to sensors needed to operate the powered devices efficiently. In one embodiment, a system includes a first sensor that may be onboard a first vehicle. The first sensor may sense one or more environmental parameters. The system may include a second sensor that may be disposed onboard a second vehicle. The second sensor may sense the same or different environmental parameters. The system includes a controller that may be disposed onboard the first vehicle. The controller may receive a first signal output by the first sensor that indicates a value of the one or more environmental parameters sensed by the first sensor.

The controller may control operation of a power component of the first vehicle using the value of the environmental parameters received from the first sensor. The controller may detect that the first sensor is operating in a determined manner (such as degraded performance, an error, or a failure) and transition to receiving a second signal output by the second sensor that indicates the value of the environmental parameters. The controller may control the operation of the power component of the first vehicle using the value of the environmental parameters received from the second sensor. If needed, the controller may take into account differences in sensors, vehicle parameters, and external conditions to better approximate an expected reading at the (failed) first sensor using data sampled from the second sensor.

Figure 1:
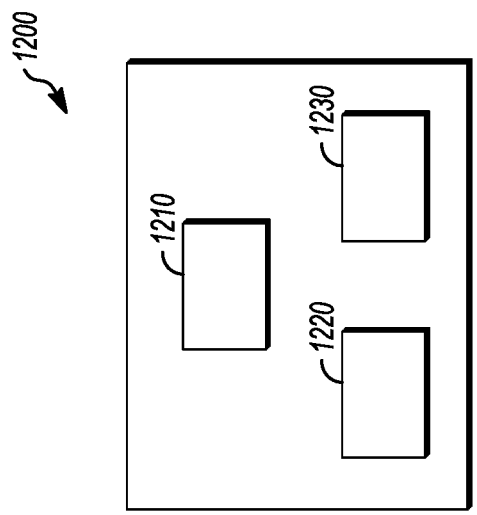
FIG. 1 shows an illustrative embodiment of a sensor system in accordance with one example.
Figure 1:
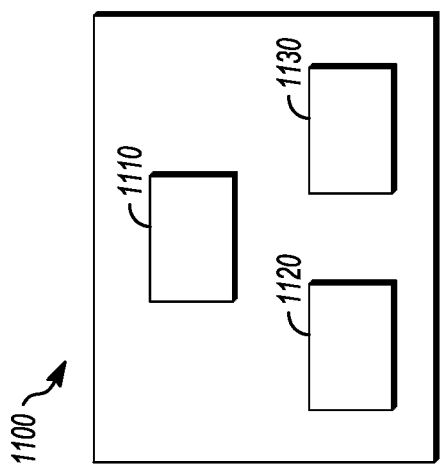

FIG. 1 is a diagram that shows a first exemplary sensor system comprising a first sensor 1110 that may be disposed onboard a first powered machine 1100. The machine may include a vehicle. Suitable vehicles may include an automobile, rail vehicle, agricultural vehicle, mining vehicle, marine vessel, aircraft, or the like. Suitable rail vehicles may include a locomotive, transit vehicle, rail car, switcher, shunter, and the like. Optionally, one of the machines may even include a stationary device whose power output is affected by the environment. This may be especially helpful where such device operates in conjunction with other devices within the same environment. In one embodiment, the first powered machine is a single vehicle system. In another embodiment, the first powered machine is a multi-vehicle system formed by two or more vehicles that are mechanically coupled with each other or that are separate, but that move together as a vehicle system or vehicle group. Suitable vehicle groups may include a convoy, swarm, fleet, platoon, consist, train, and the like.

Referring again to FIG. 1, a first sensor 1110 may sense one or more environmental parameters. The environmental parameters may include atmospheric pressure, temperature, air quality, wind speed, or other fluid speed around the first sensor. The sensor system can include a second sensor 1210 may be disposed onboard a second powered machine 1200. This second machine may be a vehicle, similar or identical to the first machine. Optionally, the second machine may be stationary, as described above. The second sensor may sense one or more environmental parameters including atmospheric pressure, temperature, air quality, wind speed, or other fluid speed around the second sensor. In one embodiment, both the first sensor and the second sensor sense the same environmental parameter. For example, both the first sensor and the second sensor may measure the atmospheric or barometric pressure. As another example, both the first sensor and the second sensor may measure the ambient temperature. Alternatively, the first sensor and the second sensor measure different parameters.

A controller 1120 is disposed onboard one or both of the powered machines. The controller can represent hardware circuitry that includes and/or connected with one or more processors that perform operations as described herein in connection with the controller. The controller is operably connected to either or both powered machines and to the first and/or second sensor. The controller may receive a first signal output by the first sensor that indicates a value of the one or more environmental parameters sensed by the first sensor. The controller may control operation of a power component 1130 of the first powered machine using the value of the one or more environmental parameters received from the first sensor. For example, the controller can change throttle settings, speeds, engage or disengage brakes, outputs of engines or motors, etc., based on the environmental parameter(s) that is or are measured by the first sensor.

The controller may detect degraded operation or failure of the first sensor and transition to receiving a second signal output by the second sensor that indicates the value of the one or more environmental parameters. For example, the output from the first sensor may no longer be received by the controller, the output from the first sensor may widely differ from prior measurements, the first sensor may output a signal to the controller that indicates the first sensor is damaged or not working as expected, etc. The controller can determine from this output or signal that the first sensor is not operating as expected.

The controller can control operation of the power component and/or the first powered machine using the value of the environmental parameter(s) that is received from the second sensor. For example, the second sensor may be a redundant sensor of the first sensor, the second sensor may be a backup of the first sensor, or the like. The controller can be capable of receiving the value of the environmental parameter from either the first sensor or the second sensor, and control operation (e.g., movement) of the vehicle or vehicle system based on the value of the environmental parameter that is received.

Referring still to FIG. 1, the controller may select from any number of sensors disposed in operable communication with the controller. The sensors may, for example, be disposed on other powered machines within the same environment. For example, the controller can primarily receive or only receive values of the environmental parameter as measured by the first sensor until the first sensor beings operating in determined manner, such as an unexpected or undesirable manner. This can occur if the sensor fails, if the sensor is damaged, if a communication pathway between the sensor and the controller fails or is no longer able to communicate the sensor output to the controller, and the like.

The controller can then switch to receiving values of the environmental parameter as measured by the second sensor. Because the second sensor may be disposed onboard the same vehicle in a single or multi-vehicle system as the first sensor, or may be disposed onboard a different vehicle in the same multi-vehicle as the first sensor, the second sensor may measure the same or substantially same value of the same environmental parameter as the first sensor measured or would have measured. For example, if the first sensor is onboard a first vehicle and the second sensor is onboard a second vehicle that is coupled with the first vehicle or that is nearby the first vehicle (e.g., within a threshold distance), then the values of the environmental parameter to which the first and second sensors are exposed to sense may be within a threshold of each other. In contrast, sensors onboard vehicles that are very far away from each other may measure very different values of the same environmental parameter.

Referring still to FIG. 1, the controller can receive the second signal from the second sensor on the same first powered machine or the second powered machine as a wireless signal. The controller can receive the second signal from the second sensor as an electronic signal conducted to the controller from the second sensor via one or more conductive pathways extending between the first powered machine and the second powered machine. In one embodiment, the sensor system may include the sensors communicating the sensor outputs to the controller using or via, for example, a Distributed Power (DP) radio (or another wireless transmission technology), using or via a Multiple Unit (MU) jumper cables, or the like, to share environmental data. Example environmental data may include barometric air pressure, ambient air temperature, speed sensors, tractive ability and/or sanding state (e.g., an indication of how much sand or other adhesive-modifying material carried by the machines, an indication of whether the sand or adhesive-modifying material is being applied to the route, etc.), or the like, between the powered machines.

Referring still to FIG. 1, the controller may change a rating of a power component, such as an engine, of the first powered machine using the value of one or more environmental parameters as received from first sensor and/or as received from the second sensor. The controller may receive the second signal from the second sensor while the first powered machine and the second powered machine are mechanically coupled with each other such as in a multi-vehicle system. Optionally, the controller may receive the second signal from the second sensor responsive to the first sensor not operating as expected, as described above. For example, the controller can switch from receiving the values of the environmental parameter from the first sensor to receiving the values of the environmental parameter from the second sensor. If the second sensor later begins operating in an unexpected way (as described above in connection with the first sensor), then the controller may switch to receiving the values of the environmental parameter from a third sensor, a fourth sensor, and so on.

In one embodiment, the controller can receive values of the environmental parameters from a sensor that is off-board the single or multi-vehicle system that includes the controller. For example, responsive to the sensor(s) onboard the vehicle system that includes the controller operating in a determined manner, such as operating with unexpected signals, erroneous signals, out-of-range signals or no signal, or in another undesirable manner, the controller can communicate with a sensor and/or controller onboard another vehicle system to obtain the values of the environmental parameter. The communication can be done through wired connectors or wirelessly, depending on end use specifications. In the illustrated embodiment, the communication is wireless. This can allow a first vehicle system having a failed or otherwise undesirably operating sensor to obtain the values of an environmental parameter sensed by a sensor onboard a separate, second vehicle system from that sensor onboard the second vehicle system while the first and second vehicle systems are within a communication range of each other. Optionally, the controller can communicate (with a sensor and/or controller onboard a stationary system. Suitable stationary systems may include one or more of a wayside device, gate, weather service station. In other embodiments, the stationary system may include temporarily stationary systems, such as a selectively mobile weather station.) These stationary systems may help to obtain the values of the environmental parameter. This can allow a vehicle system having a failed or otherwise undesirably operating sensor to obtain the values of an environmental parameter sensed by a sensor that is off-board the vehicle system from that off-board sensor while the first vehicle system is near or moving by the stationary system.

The controller may receive the second signal from the second sensor while the first powered machine and the second powered machine move in the same direction, and/or the first and second powered machines may be moving in relatively different directions. In one embodiment, the second signal may be received irrespective of whether the machines move along the same or different paths irrespective of the direction of travel. And, in one embodiment, one or more of the distance, the direction, the location, the speed, the time, and the vector of the first powered vehicle relative to the second powered vehicle is supplied along with, or as part of, the second signal.

In one example, the first and second sensors may measure the physical output, location, speed, path, etc. of the first and second powered machines or the output of the first and/or second power components. The controller may apply weighting factors or adjustments to the environmental data based at least in part on the foregoing (or other factors). For example, if the distance between the first and second sensors is very small, the controller may use the environmental data essentially unchanged as the values should be similar if not the same for both (close) locations. However, as the distance increases the likelihood of the similarity becomes more attenuated. The controller may account for known differences in the locations for each sensor, for example if the first sensor is at a much lower altitude compared to the second sensor, the temperature might be expected to be higher, the pressures might be expected to be higher, etc. relative to the second sensor readings. Regarding the vectors of relative movement of the sensor sample points, if the controller determines that the second sensor is moving towards the first sensor location then the controller may reduce the modification so that as the sensors approach one another, the readings are expected by the controller to be more alike. And, the converse is true as well in diverging movements. In one embodiment, the controller has determined limits set with threshold values such that outside of determined ranges (e.g., distance, time) the controller does not trust or use a sensor swapping technique as described herein. The first and second sensors may measure a state of an adhesion-modifying device of the first powered machine or the second powered machine.

The controller disposed onboard the first powered machine may derate the first power component of the first powered machine responsive to no longer receiving values of the environmental condition. In one embodiment, the deration is done automatically. The controller may switch to receiving the values of the environmental condition from the first sensor to receiving the values of the environmental condition from the second sensor to avoid unnecessarily derating the power component. Optionally, the controller may responsively signal the operator of the vehicle, the passenger on the vehicle, and/or a back office system regarding the machine status.

In one embodiment, the first and second powered machines may be interchangeable. For example, either machine may be the "first" or "second" machine as those designations are used in this description. Further, one may be designated as a lead or master machine and the other as a follower or slave machine, in one embodiment. The first and second designations may be dynamic in one embodiment, in that they may be exchanged during operation.

Figure 2:
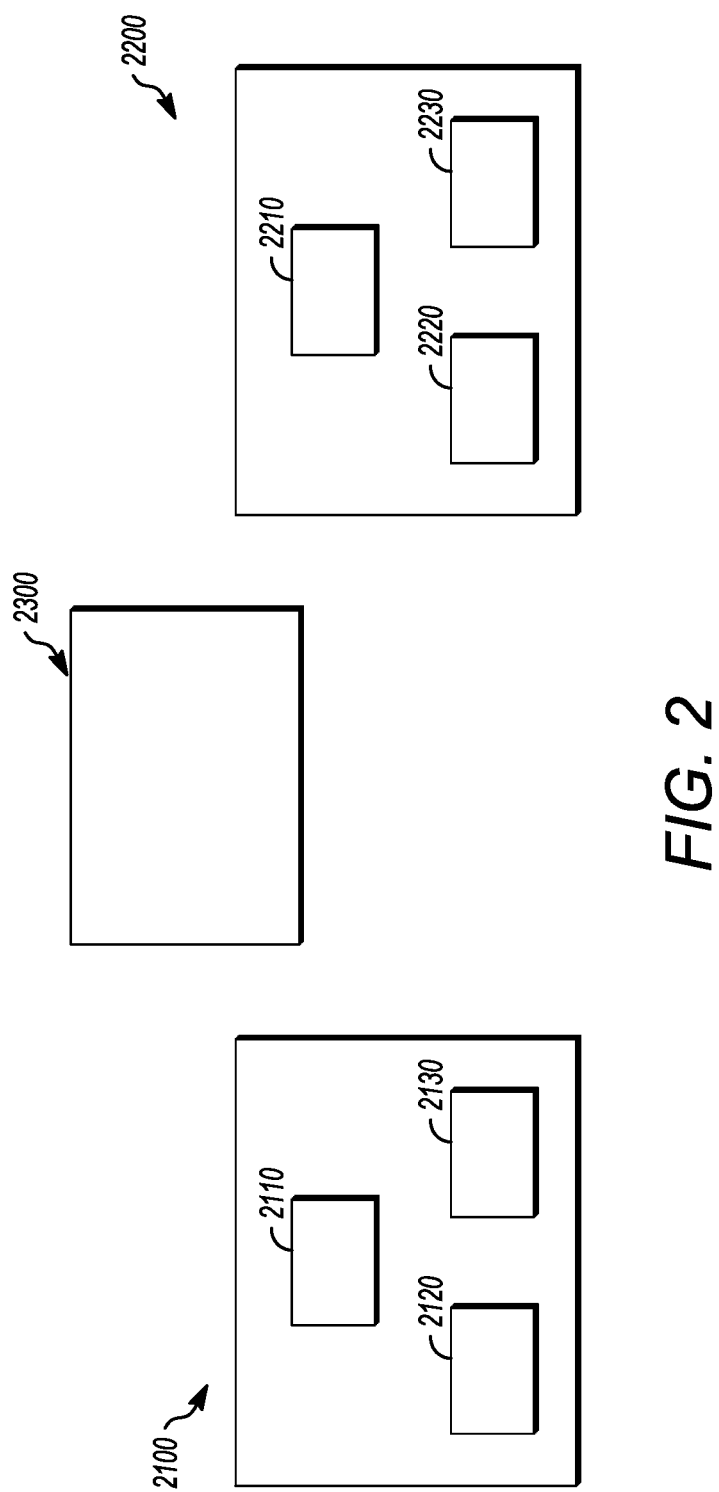
FIG. 2 shows an illustrative embodiment of a sensor system in accordance with another example.

FIG. 2 shows a second exemplary sensor system comprising a first sensor 2110 that may be disposed onboard a first powered machine 2100. The first powered machine may include a vehicle such as an automobile, a train car, or other moving machine. However, the first machine may include any machine having an internal combustion or electronic engine that is exposed to an environment. The first machine may even include a stationary device whose power output is affected by the environment especially where such device operates in conjunction with other devices within the same environment.

The first sensor may sense one or more environmental parameters. Environmental parameters may include one or more of atmospheric pressure, temperature, air quality, wind speed, humidity, air ionization, air quality (e.g., dust content, pollution content), or a fluid speed around the first sensor. The sensor system may include a second sensor 1210 that may be disposed onboard a second powered machine or vehicle 1200. The second sensor may sense one or more environmental parameters, such as the first sensor, but the sensors may differ from each other in some embodiments.

Referring again to FIG. 2, a controller 2120 is disposed onboard the first powered machine. This controller is operably connected to the first powered machine and to the first sensor 2110. The controller may receive a first signal output by the first sensor that indicates a value of the one or more environmental parameters sensed by the first sensor. The controller may control operation of a power component 2130 of the first powered machine using the value of the one or more environmental parameters received from the first sensor. The controller may be preprogrammed or remoted adjusted wirelessly, such as via BLUETOOTH, to adjust the function of the power component as a function of one or more one or more environmental parameters received from the first sensor.

Referring still to FIG. 2, the controller may detect degraded operation or failure of the first sensor and transition to receive a signal output by the second sensor that indicates the value of the same one or more environmental parameters. Alternatively, the controller may receive a signal output from a third environmental or remote sensor 2300 regarding the same environmental parameter, where the third sensor is disposed at one or more remote stationary locations within the environment in which the powered machines operate.

The controller may control operation of the power component of the first powered machine using the value of the one or more environmental parameters received from the first sensor, second sensor, remote sensor, or the like. In one embodiment, the controller may control operation based at least in part on two or more of the environmental parameters.

Referring again to FIG. 2, the controller may select from any number of sensors disposed in operable communication with the controller. These sensors may, for example, be disposed on other powered machines within the same environment.

Figure 3:
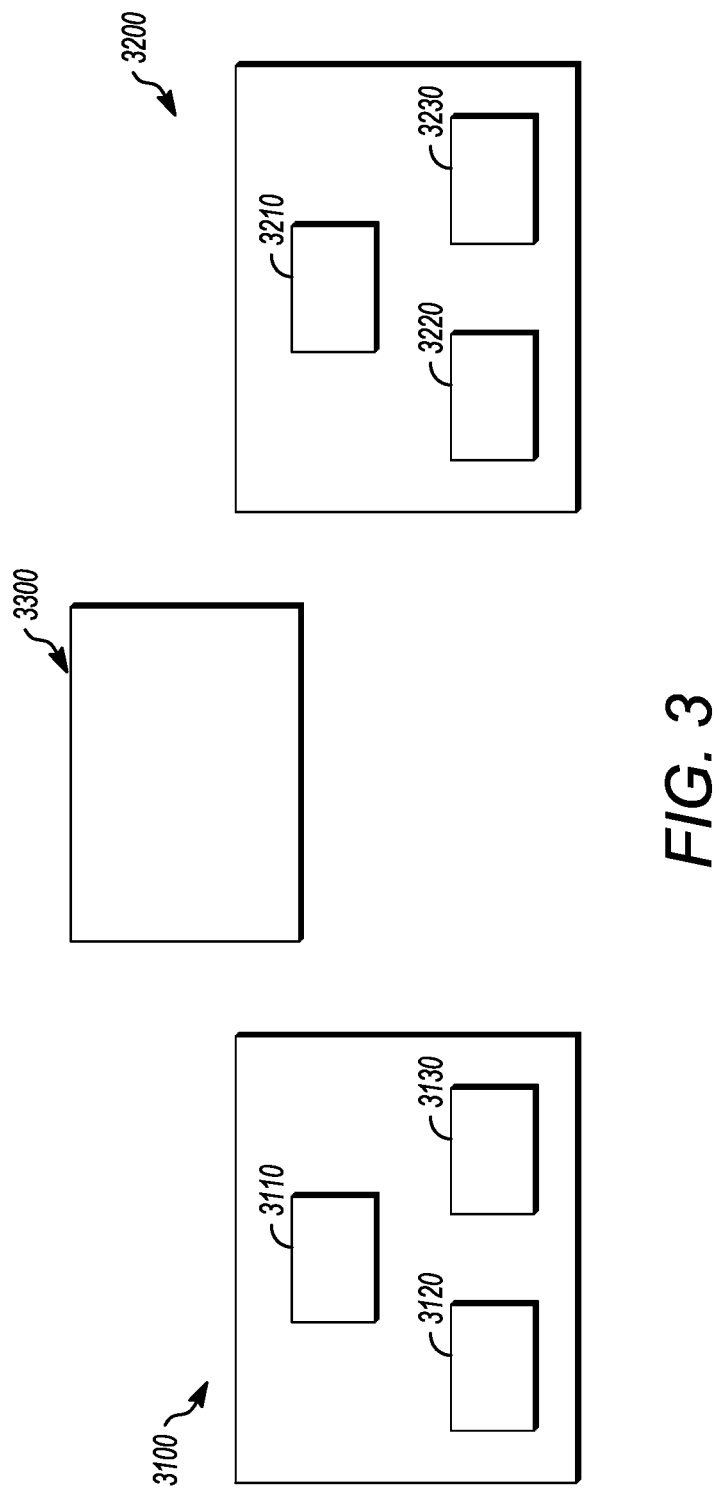
FIG. 3 shows an illustrative embodiment of a sensor system in accordance with another example.

FIG. 3 shows a third exemplary sensor system comprising a first sensor 3110 that may be disposed onboard a first powered machine 3100. The first powered machine may include a vehicle, as described above. Alternatively, this machine may include another type of machine. The machine may even include a stationary device whose power output is affected by the environment especially where such device operates in conjunction with other devices within the same environment.

Referring again to FIG. 3, the first sensor may sense one or more environmental parameters, as described above. The sensor system may include a second sensor 3210 disposed onboard a second powered machine or vehicle 3200. The second sensor may sense one or more environmental parameters around the second sensor, similar or identical to the first sensor.

Referring again to FIG. 3, a controller 3120 is disposed onboard the powered machine, and may be operably connected to the powered machine and to the first sensor. The controller may receive a first signal output by the first sensor that indicates a value of the one or more environmental parameters sensed by the first sensor. The controller may control operation of a power component 3130 of the first powered machine using the value of the one or more environmental parameters received from the first sensor, as described above.

The controller may detect degraded operation, failure, unexpected, or undesirable operation of the first sensor and transition to receive a signal output by a second sensor 3210. This signal from the second sensor may indicate the value of the one or more environmental parameters that previously were sensed by the first sensor. Alternatively, the controller may receive signal output regarding an environmental parameter from an environmental communicator 3300 disposed remotely from the powered machines but updated via the Internet or human input with environmental information from the location in which the machines operate. This environmental communicator may represent a wayside or other off-board device or system that is not onboard the same vehicle or vehicle system as the first and second sensors. For example, this environmental communicator can represent a wireless transceiver, wayside device, weather service, or the like, which communicates the environmental parameter value(s) from off-board the vehicle system or the controller.

The controller may control the operation of the power component of the first powered machine using the value of the one or more environmental parameters received from the first sensor, from the second sensor, and/or from the environmental communicator, as described above. The controller may select from any number of properly functioning sensors disposed in operable communication with the controller, as described above. These functioning sensors may, for example, be disposed on other powered machines within the same environment.

In one embodiment, the controllers or systems described herein may have a local data collection system deployed that may use machine learning to enable derivation-based learning outcomes. The controllers may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controllers may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

Figure 4:
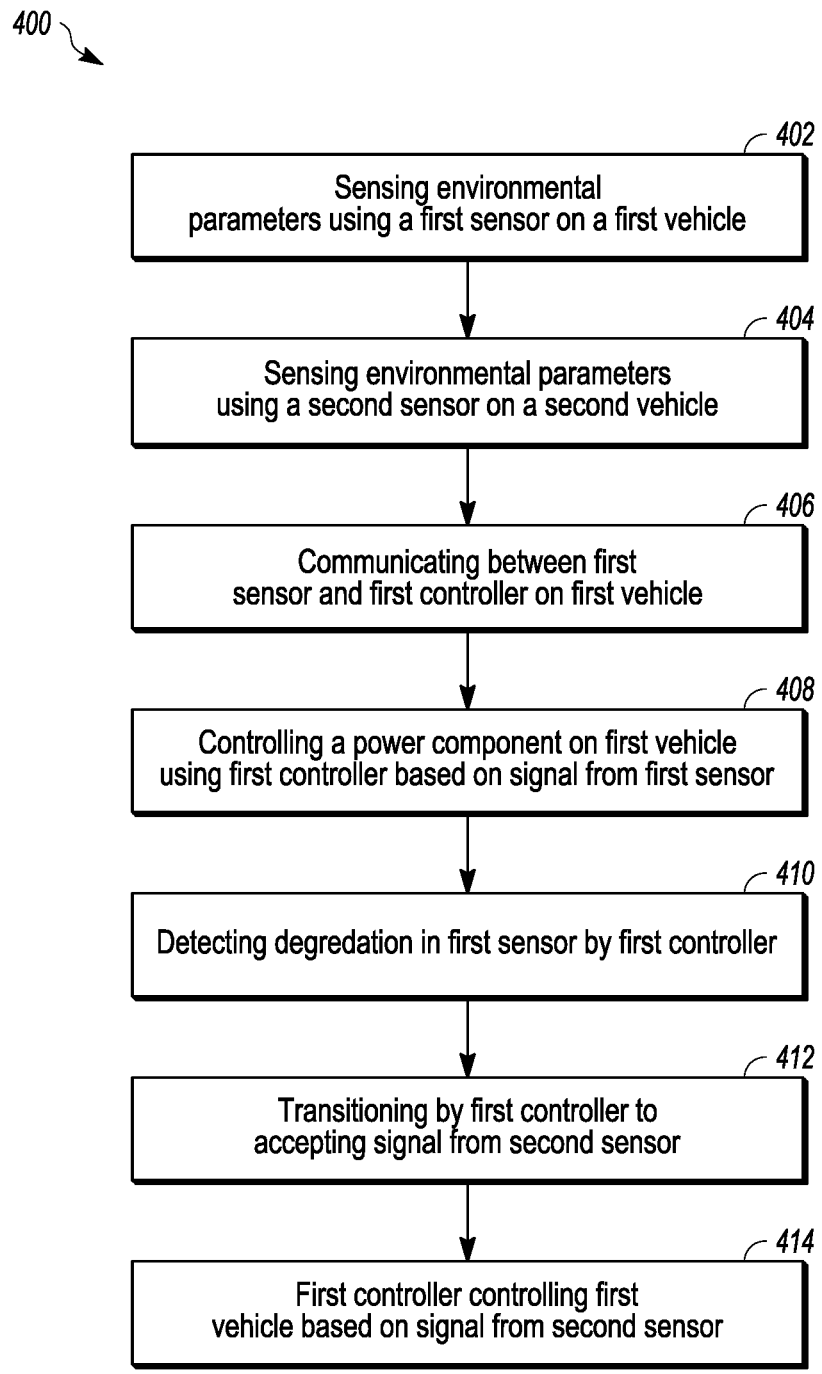
FIG. 4 shows an illustrative embodiment of a flowchart of a method for controlling operation of a powered machine.

FIG. 4 illustrates a flowchart of one example of a method for controlling operation of a powered machine using sensed environmental parameters. At step 402, a value of an environmental parameter is sensed using a first sensor onboard a first powered machine. This value can represent air quality, barometric pressure, ambient temperature, or the like, outside of or around the powered machine. At step 404, the value of the one or more environmental parameters may be sensed or measured using a second sensor disposed onboard the same powered machine as the first sensor, or onboard a second powered machine. At step 406, a first signal is communicated from the first sensor to a controller onboard the first powered machine. The first signal can indicate a value of the one or more environmental parameters as sensed by the first sensor. At step 408, operation of a power component of the powered machine is controlled using the controller and based on the value of the one or more environmental parameters as received from the first sensor.

At step 410, a degraded operation, unexpected operation, undesirable operation, or failure of the first sensor is detected or identified. At step 412, the sensor system (e.g., the controller) transitions to receiving a second signal output by the second sensor. This second signal can indicate the value of the environmental parameter(s). At step 414, operation of the power component is controlled using the value of the environmental parameter(s) as received from the second sensor.

Figure 5:
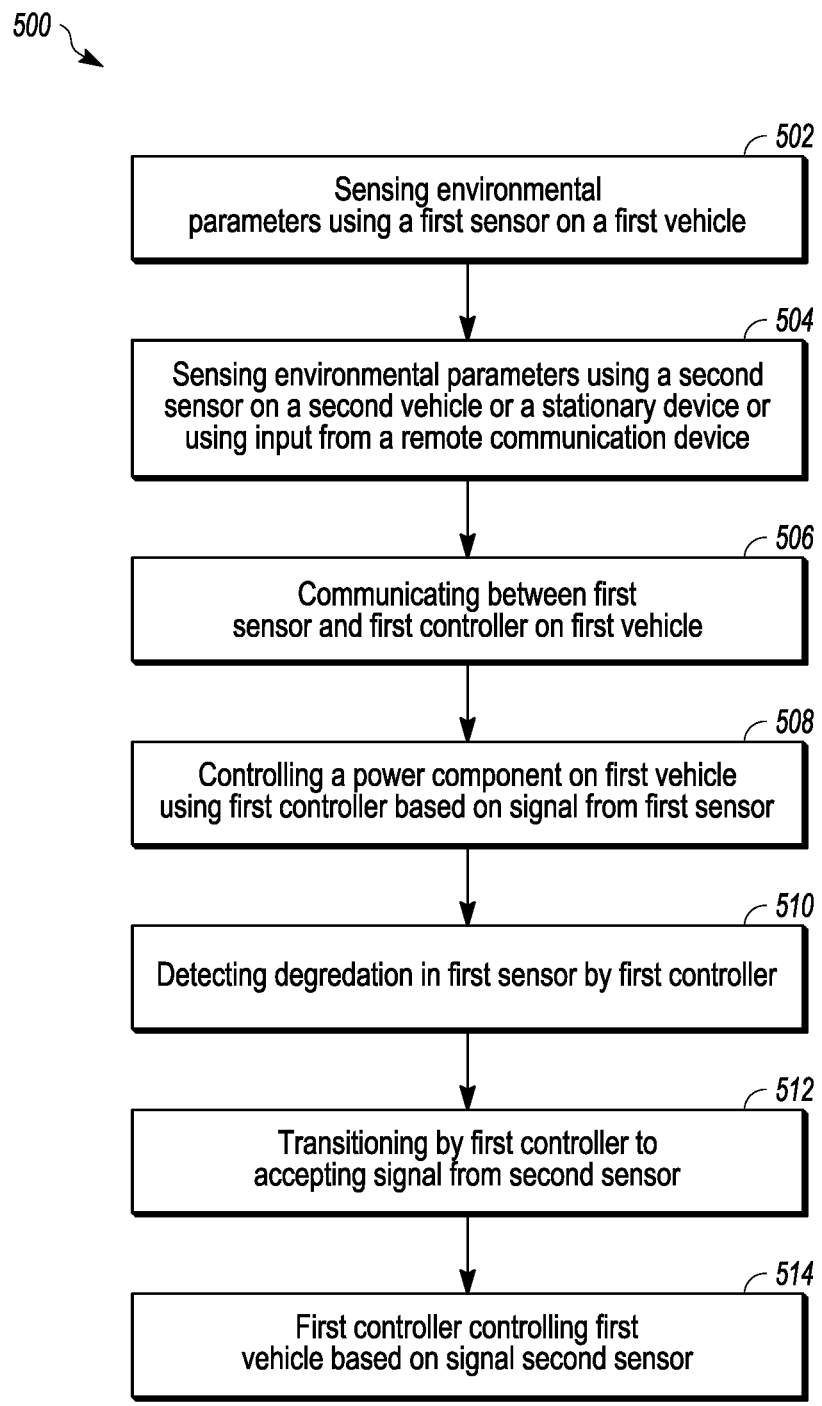
FIG. 5 shows an illustrative embodiment of a flowchart of another method for controlling operation of a powered machine.

FIG. 5 illustrates a flowchart of another method for controlling operation of a powered system. At step 502, one or more environmental parameters, such as air quality, barometric pressure, or ambient temperature are sensed using a first sensor disposed onboard a first powered machine. At step 504, the one or more environmental parameters optionally are sensed using a second sensor, which may be disposed onboard a second powered machine or off-board the first powered machine. At step 506, a first signal is communicated from the first sensor to a controller onboard the first powered machine. The first signal indicates a value of the one or more environmental parameters sensed by first sensor.

At step 508, operation of a power component of the first powered machine is controlled using controller and based on the value of the one or more environmental parameters received from the first sensor. At step 510, a degraded operation or failure of the first sensor is detected. At step 512, the controller transitions to receiving a second signal output by a second sensor onboard the same powered machine, onboard another powered machine, or at a wayside device. The second signal indicates the value of the one or more environmental parameters. At step 514, operation of the power component is controlled by the controller using the value of the one or more environmental parameters as received from the second sensor.

The signal from the second sensor may be communicated as a wireless signal sensor to the controller. Optionally, the signal from the second sensor may be communicated via conductive pathways extending between the powered machines.

Referring again generally to FIGS. 4 and 5, the controlling the operation of includes changing a rating of an engine of a first powered machine, which may include a first vehicle, using the value of the one or more environmental parameters as received from a first sensor and as received from a second sensor on a second vehicle. In this example, the first vehicle and the second vehicle may be mechanically coupled with each other in a multi-vehicle system. Alternatively, the first vehicle and the second vehicle may remain separate but move together as a convoy, or the first vehicle and the second vehicle may remain separate and move in different directions.

In one embodiment, a system according to the invention allows for the controller of a power component to continue to cause the power component to operate at full capacity or peak efficiency even if the sensors physically connected to the power component have become degraded or failed. In situations where the power component is operably attached to a vehicle or other moving device, the controller can maximize efficiency, speed, fuel retention or any other output parameter as a function of environmental conditions. This technology is applicable to vehicles (trucks, boats, planes, etc.) that are traveling in a pack/convoy to continue to operate at full capacity even with the degradation of some sensors. The technology of the present invention is further applicable to any other power component employed in an uncontrolled environment, especially where such power component must work with other power components in the same environment.

Not all embodiments of the inventive subject matter described herein is limited to heavy duty vehicles. One or more embodiments of the systems described herein can be used to power propulsion systems (e.g., motors) of a variety of vehicles, such as traction motors of rail vehicles (e.g., locomotives), traction motors of automobiles, motors that rotate propellers of marine vessels, traction motors of mining vehicles, motors of other off-highway vehicles (e.g., vehicles that are not legally permitted and/or are not designed for self-propulsion along public roadways), etc.

In one example, a system (e.g., a sensor system for a vehicle) includes a first sensor onboard a first vehicle that may sense one or more environmental parameters, a second sensor onboard a second vehicle that may sense the one or more environmental parameters, and a controller onboard the first vehicle that may receive a first signal output by the first sensor that indicates a value of the one or more environmental parameters sensed by the first sensor. The controller may control operation of a power component of the first vehicle using the value of the one or more environmental parameters received from the first sensor. The controller may detect undesirable operation of the first sensor and transition to receiving a second signal output by the second sensor that indicates the value of the one or more environmental parameters. The controller may control the operation of the power component of the first vehicle using the value of the one or more environmental parameters received from the second sensor.

The controller may receive the second signal from the second sensor on the second vehicle as a wireless signal. The controller may receive the second signal from the second sensor on the second vehicle as an electronic signal conducted to the controller from the second sensor via one or more conductive pathways extending between the first vehicle and the second vehicle. The controller may change a rating of an engine of the first vehicle using the value of the one or more environmental parameters as received from the first sensor and as received from the second sensor.

The controller may receive the second signal from the second sensor while the first vehicle and the second vehicle are mechanically coupled with each other in a multi-vehicle system. The controller may receive the second signal from the second sensor while the first vehicle and the second vehicle remain separate but move together as a vehicle group. The controller may receive the second signal from the second sensor while the first vehicle and the second vehicle remain separate and move in different directions relative to each other.

The first sensor and the second sensor may measure one or more of barometric air pressure, ambient air temperature, air quality, and/or a moving speed of at least one of the first vehicle and the second vehicle as the one or more environmental parameters. The first sensor and the second sensor may measure a state of an adhesion-modifying device or a level of tractive effort of the first vehicle or the second vehicle as the one or more environmental parameters.

In another example, a method (e.g., for controlling operation of a vehicle) may include sensing one or more environmental parameters using a first sensor disposed onboard a first vehicle, sensing the one or more environmental parameters using a second sensor disposed onboard a second vehicle, and communicating a first signal from the first sensor to a controller disposed onboard the first vehicle. The first signal may indicate a value of the one or more environmental parameters sensed by the first sensor. The method may include controlling operation of a power component of the first vehicle using a controller onboard the first vehicle based on the value of the one or more environmental parameters received from the first sensor, detecting undesired operation of the first sensor, and transitioning to communicating a second signal output by the second sensor to the controller. The second signal may indicate the value of the one or more environmental parameters. The method also may include controlling the operation of the power component of the first vehicle using the value of the one or more environmental parameters received from the second sensor.

The second signal may be communicated as a wireless signal from the second sensor to the controller. The second signal may be communicated as an electronic signal conducted to the controller from the second sensor via one or more conductive pathways extending between the first vehicle and the second vehicle. The second signal may be communicated from the second sensor to the controller while the first vehicle and the second vehicle are mechanically coupled with each other in a multi-vehicle system.

Controlling the operation of the power component may include changing a rating of an engine of the first vehicle using the value of the one or more environmental parameters as received from the first sensor and as received from the second sensor. The second signal may be communicated from the second sensor to the controller while the first vehicle and the second vehicle remain separate but move together as a vehicle group. The second signal may be communicated from the second sensor to the controller while the first vehicle and the second vehicle remain separate and move in different directions relative to each other, and further comprising adjusting a value associated with the second signal based at least in part on a determined distance between the first and second vehicles.

The one or more environmental parameters may include one or more of barometric air pressure, ambient air temperature, air quality, and/or a moving speed of at least one of the first vehicle and the second vehicle. The one or more environmental parameters may include a state of an adhesion-modifying device of the first vehicle or the second vehicle as the one or more environmental parameters.

In another example, a system (e.g., a vehicle sensor system) includes a first sensor disposed onboard a first vehicle of a multi-vehicle system and a second sensor disposed onboard a second vehicle of the multi-vehicle system. Both the first sensor and the second sensor may measure values of an environmental condition outside of the multi-vehicle system. The system may include a controller disposed onboard the first vehicle that may automatically derate the engine of the first vehicle responsive to no longer receiving the values of the environmental condition. The controller may switch to receiving the values of the environmental condition from the first sensor to receiving the values of the environmental condition from the second sensor to avoid derating the engine of the first vehicle. The first vehicle and the second vehicle may not be mechanically coupled with each other.

As used herein, an element or step recited in the singular and proceeded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes,"

"having," or "has" an element or a plurality of elements having a particular property may include additional such elements not having that property. In the appended claims, the terms "including" and "in which" are used as the plain-English equivalents of the respective terms "comprising" and "wherein." Moreover, in the following clauses, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

The above description is illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein define the parameters of the inventive subject matter, they are exemplary embodiments. Other embodiments will be apparent to one of ordinary skill in the art upon reviewing the above description. The scope of the inventive subject matter should, therefore, be determined with reference to the appended claims, along with the full scope of equivalents to which such clauses are entitled.

This written description uses examples to disclose several embodiments of the inventive subject matter, including the best mode, and to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A system, comprising:
a first sensor configured to be onboard a first vehicle, the first sensor configured to sense one or more environmental parameters;
a second sensor configured to be onboard a second vehicle, the second sensor configured to sense the one or more environmental parameters;
a controller configured to be onboard the first vehicle, the controller configured to receive a first signal output by the first sensor that indicates a value of the one or more environmental parameters sensed by the first sensor, the controller configured to control operation of a power component of the first vehicle using the value of the one or more environmental parameters received from the first sensor,
the controller is configured to detect undesirable operation of the first sensor and to transition to receiving a second signal output by the second sensor that indicates the value of the one or more environmental parameters, the controller is configured to control the operation of the power component of the first vehicle using the value of the one or more environmental parameters received from the second sensor; and
the controller is configured to adjust the value of the one or more environmental parameters from the second signal based at least in part on a determined distance between the first vehicle and the second vehicle.

2. The system of claim 1, wherein the controller is configured to receive the second signal from the second sensor on the second vehicle as a wireless signal.

3. The system of claim 1, wherein the controller is configured to receive the second signal from the second sensor on the second vehicle as an electronic signal conducted to the controller from the second sensor via one or more conductive pathways extending between the first vehicle and the second vehicle.

4. The system of claim 1, wherein the controller is configured to change a rating of an engine of the first vehicle using the value of the one or more environmental parameters as received from the first sensor and as received from the second sensor.

5. The system of claim 1, wherein the controller is configured to receive the second signal from the second sensor while the first vehicle and the second vehicle are mechanically coupled with each other in a multi-vehicle system.

6. The system of claim 1, wherein the controller is configured to receive the second signal from the second sensor while the first vehicle and the second vehicle remain separate but move together as a vehicle group.

7. The system of claim 1, wherein the controller is configured to receive the second signal from the second sensor while the first vehicle and the second vehicle remain separate and move in different directions relative to each other.

8. The system of claim 1, wherein the first sensor and the second sensor are configured to measure one or more of barometric air pressure, ambient air temperature, air quality, and a moving speed of at least one of the first vehicle and the second vehicle as the one or more environmental parameters.

9. The system of claim 1, wherein the first sensor and the second sensor are configured to measure a state of an adhesion-modifying device or a level of tractive effort of the first vehicle or the second vehicle as the one or more environmental parameters.

10. A method comprising:
sensing one or more environmental parameters using a first sensor disposed onboard a first vehicle;
sensing the one or more environmental parameters using a second sensor disposed onboard a second vehicle;
communicating a first signal from the first sensor to a controller disposed onboard the first vehicle, the first signal indicating a value of the one or more environmental parameters sensed by the first sensor;
controlling operation of a power component of the first vehicle using a controller onboard the first vehicle based on the value of the one or more environmental parameters received from the first sensor;

detecting undesired operation of the first sensor;

transitioning to communicating a second signal output by the second sensor to the controller, the second signal indicating the value of the one or more environmental parameters;

adjusting the value of the one or more environmental parameters from the second signal based at least in part on a determined distance between the first and the second vehicles; and controlling the operation of the power component of the first vehicle using the value of the one or more environmental parameters received from the second sensor.

11. The method of claim 10, wherein the second signal is communicated as a wireless signal from the second sensor to the controller.

12. The method of claim 10, wherein the second signal is communicated as an electronic signal conducted to the controller from the second sensor via one or more conductive pathways extending between the first vehicle and the second vehicle.

13. The method of claim 12, wherein the second signal is communicated from the second sensor to the controller while the first vehicle and the second vehicle are mechanically coupled with each other in a multi-vehicle system.

14. The method of claim 10, wherein controlling the operation of the power component includes changing a rating of an engine of the first vehicle using the value of the one or more environmental parameters as received from the first sensor and as received from the second sensor.

15. The method of claim 10, wherein the second signal is communicated from the second sensor to the controller while the first vehicle and the second vehicle remain separate but move together as a vehicle group.

16. The method of claim 10, wherein the second signal is communicated from the second sensor to the controller while the first vehicle and the second vehicle remain separate and move in different directions relative to each other.

17. The method of claim 10, wherein the one or more environmental parameters include one or more of barometric air pressure, ambient air temperature, air quality, and a moving speed of at least one of the first vehicle and the second vehicle.

18. The method of claim 10, wherein the one or more environmental parameters include a state of an adhesion-modifying device of the first vehicle or the second vehicle as the one or more environmental parameters.

19. A system comprising:
a first sensor disposed onboard a first vehicle of a multi-vehicle system;
a second sensor disposed onboard a second vehicle of the multi-vehicle system, both the first sensor and the second sensor measuring values of an environmental condition outside of the multi-vehicle system; and
a controller disposed onboard the first vehicle, the controller configured to;
automatically derate the engine of the first vehicle responsive to no longer receiving the values of the environmental condition;
to switch to receiving the values of the environmental condition from the first sensor to receiving the values of the environmental condition from the second sensor to avoid derating the engine of the first vehicle,
wherein the controller is configured to adjust the values of the environmental condition from the second signal based at least in part on a determined distance between the first and second vehicles.

20. The system of claim 19, wherein the first vehicle and the second vehicle are not mechanically coupled with each other.

* * * * *